United States Patent
Wang et al.

(10) Patent No.: US 9,180,754 B2
(45) Date of Patent: Nov. 10, 2015

(54) HEAT PUMP SYSTEM FOR VEHICLE

(75) Inventors: Yoonho Wang, Daejeon-si (KR);
Sungho Kang, Daejeon-si (KR);
Jeonghun Seo, Daejeon-si (KR);
Younwoo Lim, Daejeon-si (KR);
Hakkyu Kim, Daejeon-si (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 164 days.

(21) Appl. No.: 13/273,273

(22) Filed: Oct. 14, 2011

(65) Prior Publication Data

US 2012/0227431 A1    Sep. 13, 2012

(30) Foreign Application Priority Data

Mar. 9, 2011    (KR) .................. 10-2011-0021073

(51) Int. Cl.
*F25B 27/00*    (2006.01)
*B60H 1/00*    (2006.01)
*B60H 1/14*    (2006.01)

(52) U.S. Cl.
CPC ............ *B60H 1/00921* (2013.01); *B60H 1/143* (2013.01); *B60H 2001/00307* (2013.01); *B60H 2001/00949* (2013.01)

(58) Field of Classification Search
CPC ........ F25B 31/006; F25B 30/02; F25B 40/06; F25B 2400/04; B60H 1/32; B60H 2001/00307; B60H 2001/00949
USPC ................. 62/239, 259.2, 324.6, 324.1, 244
See application file for complete search history.

(56) References Cited

U.S. PATENT DOCUMENTS

| | | | |
|---|---|---|---|
| 6,347,528 B1 * | 2/2002 | Iritani et al. .............. | 62/324.6 |
| 7,055,590 B2 * | 6/2006 | Hara ............................ | 165/202 |
| 7,458,226 B2 * | 12/2008 | Nakamura et al. ......... | 62/228.1 |
| 2002/0046570 A1 * | 4/2002 | Itoh et al. .................... | 62/324.1 |
| 2009/0241573 A1 * | 10/2009 | Ikegami et al. ............. | 62/238.7 |
| 2011/0139397 A1 | 6/2011 | Haussmann | |

FOREIGN PATENT DOCUMENTS

| | | |
|---|---|---|
| DE | 10 343 818 A1 | 4/2004 |
| EP | 2 301 777 | 3/2011 |
| JP | 5319077 A | 12/1993 |
| JP | 2000203249 | 7/2000 |

(Continued)

*Primary Examiner* — Cheryl J Tyler
*Assistant Examiner* — Elizabeth Martin
(74) *Attorney, Agent, or Firm* — Norton Rose Fulbright US LLP

(57) ABSTRACT

A heat pump system including a water-cooled type heat exchanger, which is a heat supply means, mounted on a first bypass line bypassing a second indoor heat exchanger to collect waste heat of vehicle electric devices to thereby enhance a heating efficiency of the heat pump system. The heat pump system for a vehicle includes: a branch line for connecting a refrigerant circulation line of the second indoor heat exchanger and the first bypass line with each other; a second bypass line, which bypasses an outdoor heat exchanger; and a control part that controls a flow of the indoor air to be introduced into an air-conditioning case, whereby the heat pump system can minimize influences of the outdoor air of low temperature even when the outdoor temperature is below zero, enhance the operation and the heating performance of the heat pump system by collecting waste heat of the vehicle electric devices and heat sources of the indoor air, and increase the mileage of the vehicle by minimizing operation of an electric heater.

14 Claims, 8 Drawing Sheets

(56) References Cited

FOREIGN PATENT DOCUMENTS

| JP | 2004142646 | | 5/2004 |
| JP | 2010-159007 | | 7/2010 |
| JP | 2011-031704 A | | 2/2011 |
| KR | 10-0963433 B1 | | 3/2005 |
| KR | 1020050022784 | | 3/2005 |
| KR | 10-20070046324 A | | 5/2007 |
| KR | 20070082274 | * | 8/2007 |

* cited by examiner

PRIOR ART

Prior Art

Implementation

HEAT PUMP SYSTEM FOR VEHICLE

RELATED APPLICATIONS

This application claims priority under 35 U.S.C. §119 from Korean Patent Application No. 10-2011-0021073 filed Mar. 9, 2011, incorporated herein by reference in its entirety for all purposes.

BACKGROUND OF THE INVENTION

1. Field of the Invention

The present invention relates to a heat pump system for a vehicle, and more particularly, to a heat pump system for a vehicle that includes: a water-cooled type heat exchanger, which is a heat supply means, mounted on a first bypass line, which bypasses a second indoor heat exchanger (evaporator), for collecting waste heat of vehicle electric devices; a branch line for connecting a refrigerant circulation line of the second indoor heat exchanger and the first bypass line with each other; and a second bypass line, which bypasses an outdoor heat exchanger.

2. Background Art

An air conditioner for a vehicle generally includes a cooling system for cooling the inside of the vehicle and a heating system for heating the inside of the vehicle. The cooling system exchanges heat between air, which passes through the outside of an evaporator near the evaporator of a refrigerant cycle, and refrigerant, which flows inside the evaporator, to thereby change the air into cold air, so that the cooling system can cool the inside of the vehicle. The heating system exchanges heat between air, which passes near the outside of a heater core of a cooling water cycle, and cooling water, which flows inside the heater core, to thereby change the air into warm air, so that the cooling system can heat the inside of the vehicle.

In the meantime, differently from the air conditioner for the vehicle, but a heat pump system that selectively carries out cooling and heating by converting a flow direction of refrigerant using one refrigerant, cycle is applied to the vehicle. For instance, the heat pump system includes two heat exchangers: one being an indoor heat exchanger mounted inside an air-conditioning case to carry out heat-exchange with air blown to the inside of the vehicle; and the other being an outdoor heat exchanger mounted outside the air-conditioning case to carry out heat-exchange, and a direction-switching valve which can convert a flow direction of refrigerant.

Accordingly, in the case that a cooling mode is operated according to the flow direction of refrigerant by the direction-switching valve, the indoor heat exchanger serves as a heat exchanger for cooling, but in the case that a heating mode is operated, the indoor heat exchanger serves as a heat exchanger for heating.

There are various kinds of heat pump systems for vehicles, and FIG. 1 illustrates an example of the heat pump systems.

The heat pump system for a vehicle illustrated in FIG. 1 includes: a compressor 30 for compressing and discharging refrigerant; a high pressure heat exchanger 32 for radiating heat of the refrigerant discharged from the compressor 30; a first expansion valve 34 and a first bypass valve 36, which are mounted in parallel and selectively passes the refrigerant passing through the high pressure heat exchanger 32; an outdoor unit 48 for heat-exchanging the refrigerant, which passes through the first expansion valve 34 or the first bypass valve 36, outdoors; a low pressure heat exchanger 60 for evaporating the refrigerant that passes through the outdoor unit 48; an accumulator 62 for dividing the refrigerant, which passé through the low pressure heat exchanger 60, into a gas phase and a liquid phase; an indoor heat exchanger 50 for exchanging heat between refrigerant supplied to the low pressure heat exchanger 60 and refrigerant returning to the compressor 30; a second expansion valve 56 for selectively expanding the refrigerant supplied to the low pressure heat exchanger 60; and a second bypass valve 58 mounted in parallel with the second expansion valve 56 for selectively connecting an outlet of the outdoor unit 48 with an inlet of the accumulator 62.

In FIG. 1, the reference numeral 10 designates an air-conditioning case having the high pressure heat exchanger 32 and the low pressure heat exchanger 60 therein, the reference numeral designates a temperature control door for controlling an amount of mixing between cold air and warm air, and the reference numeral 20 designates an air blower mounted at an inlet of the air-conditioning case.

In the conventional heat pump system for the vehicle having the above structure, when a heat pump mode (heating mode) is operated, the first bypass valve 36 and the second expansion valve 56 are closed but the first expansion valve 34 and the second bypass valve 58 are opened.

Moreover, the temperature control door 12 is actuated as shown in FIG. 1. Accordingly, the refrigerant discharged from the compressor 30 passes through the high pressure heat exchanger 32, the first expansion valve 34, the outdoor unit 48, a high pressure part 52 of the indoor heat exchanger 50, the second bypass valve 58, the accumulator 62, and a low pressure part 54 of the indoor heat exchanger 50 in order, and then, is returned to the compressor 30.

That is, the high pressure heat exchanger 32 serves as a heater and the outdoor unit 48 serves as an evaporator.

When an air-conditioning mode (cooling mode) is operated, the first bypass valve 36 and the second expansion valve 56 are opened, but the first expansion valve 34 and the second bypass valve 58 are closed. Furthermore, the temperature control door 12 closes a passage of the high pressure heat exchanger 32.

Accordingly, the refrigerant discharged from the compressor 30 passes through the high pressure heat exchanger 32, the first bypass valve 36, the outdoor unit 48, the high pressure part of the indoor heat exchanger 50, the second expansion valve 56, the low pressure heat exchanger 60, the accumulator 62, and the low pressure part 54 of the indoor heat exchanger 50 in order, and then, is returned to the compressor 30.

That is, the low pressure heat exchanger 60 serves as the evaporator and the high pressure heat exchanger 32 closed by the temperature control door 12 serves as the heater like in the heat pump mode.

However, in the heat pump mode (heating mode) of the conventional heat pump system for the vehicle, the high pressure heat exchanger 32 mounted inside the air-conditioning case 10 carries out heating as the heater and the outdoor unit 48 mounted outside the air-conditioning case 10, namely, in front of the engine room of the vehicle, serves as the evaporator to exchange heat with the outdoor air.

In this instance, when the outdoor temperature is low, the outdoor unit 48 serving as the evaporator cannot supply sufficient waste heat to the high pressure heat exchanger 32 serving as the heater because exchanging heat with the outdoor cold air. If a heat source is not secured in the condition that the outdoor temperature is low, the heating performance is deteriorated, and particularly, heat-exchange efficiency between refrigerant and the outdoor air is decreased due to a frost accumulation of the outdoor unit 48, so that the heating performance and the efficiency of the heat pump system are reduced.

Furthermore, in order to solve the problem of degradation of performance in the condition that the outdoor temperature is low, there is an attempt to install an electric heater (not shown) inside the air-conditioning case 10 as a main heating device or an auxiliary heating device, but in the case that the electric heater is used as the heating device, because there is a limit in electric energy to be supplied to an electric vehicle or a fuel cell vehicle, the conventional heat pump system for the vehicle has a problem in that a mileage of the vehicle by a battery drops sharply due to an excessive power consumption by the operation of the electric heater.

SUMMARY OF THE INVENTION

Accordingly, the present invention has been made to solve the above-mentioned problems occurring in the prior arts, and it is an object of the present invention to provide a heat pump system for a vehicle that includes: a water-cooled type heat exchanger, which is a heat supply means, mounted on a first bypass line bypassing a second indoor heat exchanger (evaporator) to collect waste heat of vehicle electric devices, thereby enhancing a heating of the heat pump system.

Another object of the present invention is to provide a heat pump system for a vehicle that further includes: a branch line for connecting a refrigerant circulation line of the second indoor heat exchanger and the first bypass line with each other; a second bypass line, which bypasses an outdoor heat exchanger; and a control part that controls a flow of the indoor air to be introduced into an air-conditioning case, thereby minimizing influences of the outdoor air of low temperature even when the outdoor temperature is below zero, enhancing the operation and the heating performance of the heat pump system by collecting waste heat of the vehicle electric devices and heat sources of the indoor air, and increasing the mileage of the vehicle by minimizing operation of an electric heater.

To accomplish the above object, according to the present invention, there is provided a heat pump system for a vehicle including: a compressor mounted on a refrigerant circulation line for compressing and discharging refrigerant; a first indoor heat exchanger mounted inside an air-conditioning case and connected with a refrigerant circulation line of an outlet side of the compressor to thereby exchange heat between air flowing inside the air-conditioning case and refrigerant discharged from the compressor; a second indoor heat exchanger mounted inside the air-conditioning case and connected with the refrigerant circulation line of an inlet side of the compressor to thereby exchange heat between the air flowing inside the air-conditioning case and the refrigerant supplied to the compressor; an outdoor heat exchanger mounted on the outside of the air-conditioning case for exchanging heat between the refrigerant circulating the refrigerant, circulation line and the outdoor air; a first expansion means mounted on the refrigerant circulation line of an inlet side of the second indoor heat exchanger to expand the refrigerant supplied to the second indoor heat exchanger; a first bypass line mounted to connect the refrigerant circulation line of an inlet side of the first expansion means with the refrigerant circulation line of an outlet side of the second indoor heat exchanger, so that the refrigerant bypasses the first expansion means and the second indoor heat exchanger; a first direction-switching valve mounted at a branch point between the first bypass line and the refrigerant circulation line to thereby convert a flow direction of the refrigerant so that the refrigerant passing through the outdoor heat exchanger flows toward the first bypass line and the first expansion means; heat supply means mounted on the first bypass line for supplying heat to the refrigerant flowing along the first bypass line; and a second expansion means mounted on the refrigerant circulation line of the inlet side of the outdoor heat exchanger to selectively expand the refrigerant supplied to the outdoor heat exchanger according to the air-conditioning mode or the heat pump mode.

In another aspect of the present invention, there is provided a heat pump system for a vehicle including: a compressor mounted on a refrigerant circulation line for compressing and discharging refrigerant; a first indoor heat exchanger mounted inside an air-conditioning case and connected with a refrigerant circulation line of an outlet side of the compressor to thereby exchange heat between air flowing inside the air-conditioning case and refrigerant discharged from the compressor; a second indoor heat exchanger mounted inside the air-conditioning case and connected with the refrigerant circulation line of an inlet side of the compressor to thereby exchange heat between the air flowing inside the air-conditioning case and the refrigerant supplied to the compressor; an outdoor heat exchanger mounted on the outside of the air-conditioning case for exchanging heat between the refrigerant circulating the refrigerant circulation line and the outdoor air; a first expansion means mounted on the refrigerant circulation line of an inlet side of the second indoor heat exchanger to expand the refrigerant supplied to the second indoor heat exchanger; a first bypass line mounted to connect the refrigerant circulation line of an inlet side of the first expansion means with the refrigerant circulation line of an outlet side of the second indoor heat exchanger, so that the refrigerant bypasses the first expansion means and the second indoor heat exchanger; a first direction-switching valve mounted at a branch point between the first bypass line and the refrigerant circulation line to thereby convert a flow direction of the refrigerant so that the refrigerant passing through the outdoor heat exchanger flows toward the first bypass line and the first expansion means; a branch line mounted to connect the refrigerant circulation line of the inlet side of the second indoor heat exchanger and the first bypass line with each other, so that some of the refrigerant flowing to the first bypass line flows toward the second indoor heat exchanger or some of the refrigerant supplied to the second indoor heat exchanger flows toward the first bypass line; a flow control valve mounted on the branch line to control an amount of the refrigerant flowing in the branch line; a second expansion means mounted on the refrigerant circulation line of the inlet side of the outdoor heat exchanger to selectively expand the refrigerant supplied to the outdoor heat exchanger according to the air-conditioning mode or the heat pump mode; a second bypass line connected on the refrigerant circulation line of the inlet and outlet sides of the outdoor heat exchanger in parallel, so that the refrigerant passing the second expansion means bypasses the outdoor heat exchanger; and a second direction-switching valve mounted at a branch point between the second bypass line and the refrigerant circulation line to convert a flow direction of the refrigerant in such a way that the refrigerant passing the second expansion means flows to the outdoor heat exchanger or the second bypass line according to the outdoor temperatures.

The heat pump system for the vehicle according to the present invention includes a water-cooled type heat exchanger, which is a heat supply means, mounted on a first bypass line bypassing a second indoor heat exchanger (evaporator) to collect waste heat of vehicle electric devices, so that the heat pump system can enhance a heating efficiency of the heat pump system.

Furthermore, the heat pump system further includes: a branch line for connecting a refrigerant circulation line of the second indoor heat exchanger and the first bypass line with each other; a second bypass line, which bypasses an outdoor heat exchanger; and a control part that controls a flow of the indoor air to be introduced into an air-conditioning case, so that the heat pump system can minimize influences of the outdoor air of low temperature even when the outdoor temperature is below zero, enhance the operation and the heating performance of the heat pump system by collecting waste heat of the vehicle electric devices and heat sources of the indoor air, and increase the mileage of the vehicle by minimizing operation of an electric heater.

Moreover, the heat pump system collects the waste heat of the vehicle electric devices and heat sources of the outdoor air when the outdoor temperature is above zero and collects the waste heat of the vehicle electric devices and heat sources of the indoor air when the outdoor temperature is below zero, and provides various modes, such as the maximum heating mode, the heating mode, the dehumidification mode and the defrost mode during operation in the heat pump mode according to thermal loads and purposes, so that the heat pump system can enhance and keep its efficiency and heating performance and minimize operation of the electric heater to thereby increase the mileage of the vehicle.

Additionally, in the dehumidification mode or the defrost mode during operation in the heat pump mode, the refrigerant is branched toward the water-cooled type heat exchanger and the second indoor heat exchanger through the branch line to thereby minimize a change in the indoor temperature of the vehicle while carrying the dehumidification mode and the defrost mode.

In addition, the heat pump system according to the present invention can provide agreeable environment to passengers because it can dehumidify the inside of the vehicle even in the heat pump mode.

Moreover, because the refrigerant flowing portion formed at the orifice portion formed on the first flow channel of the first expansion means (expansion valve) mounted at an inlet side of the second indoor that exchanger serves as an orifice, even in the case that it is impossible to control the first expansion means due to supercooling when the outdoor temperature is below zero, the heat pump system can carry out the that pump mode and collect the waste heat to thereby enhance the heating performance.

Furthermore, the heat pump system according to the present invention has the same refrigerant circulation direction in the air-conditioning mode and the heat pump mode, and all areas of the refrigerant circulation line excepting the first and second bypass lines and the expansion line are in common use, so that it can prevent retention of refrigerant occurring when the refrigerant does not flow and simplify the entire refrigerant circulation line.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
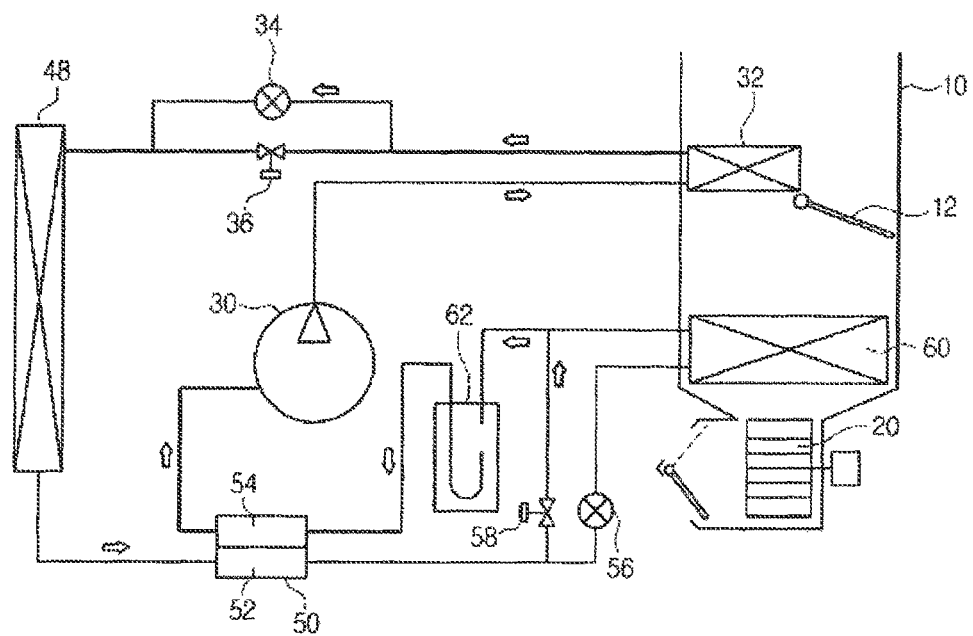
FIG. 1 is a configuration diagram of a heat pump system for a vehicle according to a prior art.

Reference will be now made in detail to the preferred embodiment of the present invention with reference to the attached drawings.

First, a heat pump system for a vehicle according to the present invention includes a compressor 100 mounted on a refrigerant circulation line R of an air-conditioning system, first indoor heat exchanger 110, a second expansion means 120, an outdoor heat exchanger 130, a first expansion means 140, and a second indoor heat exchanger 160 connected with one another in order. The heat pump system for the vehicle according to the present invention is preferably applied to electric vehicles or hybrid vehicles.

Moreover, on the refrigerant circulation line R, a first bypass line R1 which bypasses the second indoor heat exchanger 160, a second bypass line R2 which bypasses the outdoor heat exchanger 130, and an expansion line R3 constituting the second expansion means 120 are mounted in parallel. In addition, a first direction-switching valve 191 is mounted at a branch point of the first bypass line R1, a second direction-switching valve 192 is mounted at a branch point of the second bypass line R2, and a third direction-switching valve 193 is mounted at a branch point of the expansion line R3.

The heat pump system according to the present invention further includes a branch line R4 for connecting the first bypass line R1 with the refrigerant circulation line R of an inlet side of the second indoor heat exchanger 160, and a flow control valve 195 is mounted on the branch line R4.

Figure 2:
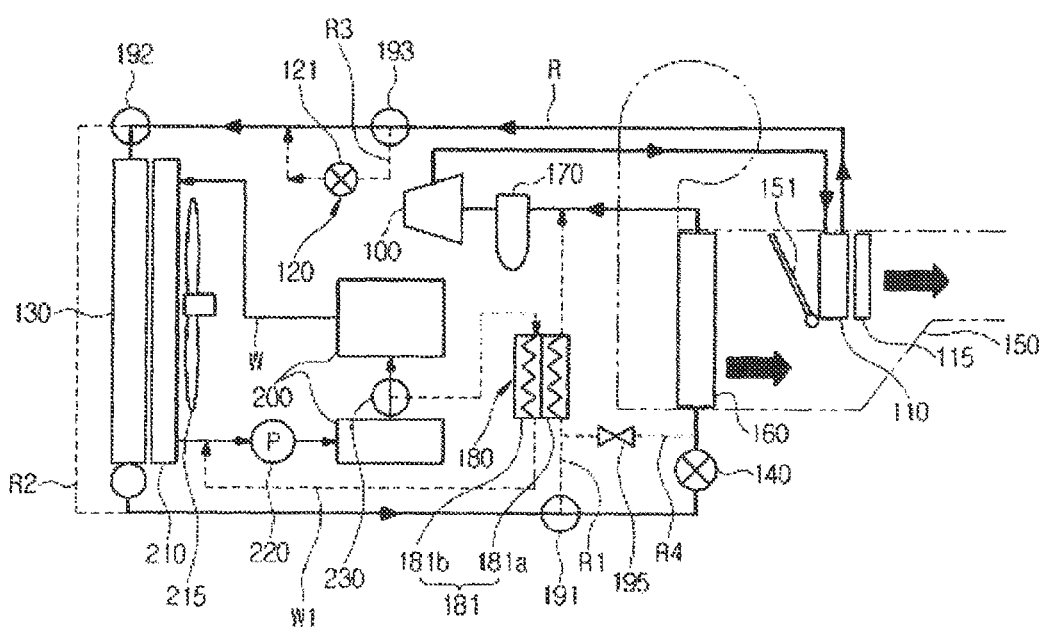
FIG. 2 is a configuration diagram showing an air-conditioning mode of a heat pump system for a vehicle.

Therefore, in an air-conditioning mode, as shown in FIG. 2, refrigerant discharged from the compressor 100 circulates the first indoor heat exchanger 110, the outdoor heat exchanger 130, the first, expansion means 140, the second indoor heat exchanger 160, and the compressor 100 in order, and in this instance, the first indoor heat exchanger 110 serves as a condenser (heater) and the second indoor heat exchanger 160 serves as an evaporator.

In the mean time, the outdoor heat exchanger 130 also serves as the condenser like the first indoor heat exchanger 110.

Figure 3:
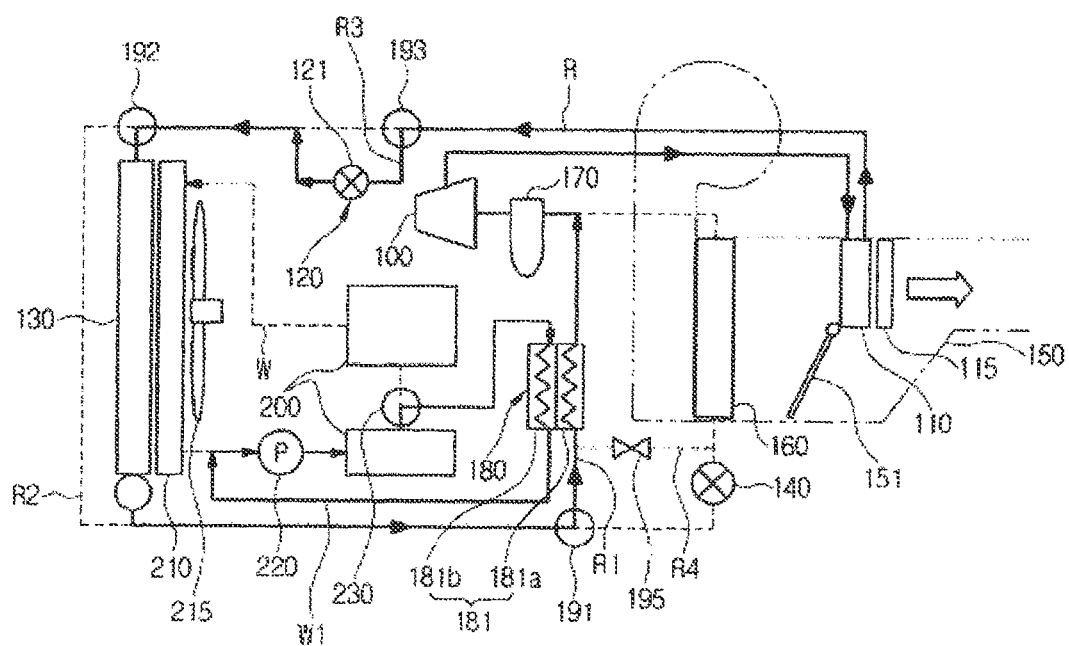
FIG. 3 is a configuration diagram showing a first heating mode during operation in a heat pump mode of the heat pump system.

In a heat pump mode (first heating mode), as shown in FIG. 3, the refrigerant discharged from the compressor 100 circulates the first indoor heat exchanger 110, an orifice 121 of the second expansion means 120, the outdoor heat exchanger 130, the first bypass line R1, and the compressor 100 in order, and in this instance, the first indoor heat exchanger 110 serves as the condenser (heater) and the outdoor heat exchanger 130 serves as the evaporator, but the refrigerant is not supplied to the second indoor heat exchanger 160.

As described above, the heat pump system according to the present invention has the same refrigerant circulation direction in the air-conditioning mode and the heat pump mode, and all areas of the refrigerant circulation line R excepting the first and second bypass lines R1 and R2 and the expansion line R3 are in common use, so that it can prevent retention of refrigerant occurring when the refrigerant does not flow and simplify the entire refrigerant circulation line R.

Additionally, the heat pump mode in the present invention is divided into a first heating mode, a second heating mode, a dehumidification mode, and a defrost mode according to the outdoor temperature, the thermal load and the purpose.

In this instance, a control part, which is not illustrated in the drawings, carries out the first heating mode, the dehumidification mode or the defrost mode during operation in the heat pump mode when the outdoor temperature is more than the reference temperature, but carries out the second heating mode during operation in the heat pump mode when the outdoor temperature is less than the reference temperature.

Here, the standard outdoor temperature for carrying out the first heating mode, the dehumidification mode or the defrost mode during operation in the heat pump mode shall be more than 0° C. (above zero), and the standard outdoor temperature for carrying out the second heating mode during operation in the heat pump mode is shall be less than 0° C. (below zero)

Of course, the reference temperature of the outdoor temperature is not restricted to 0° C. but can be varied according to purposes.

Meanwhile, the refrigerant circulation route by each mode will be described in brief as follows.

As shown in FIG. 3, the first heating mode has a circulation cycle that the refrigerant discharged from the compressor 100 passes the first indoor heat exchanger 110, the second expansion means 120 and the outdoor heat exchanger 130 and flows into the first bypass line R1, and the refrigerant introduced into the first bypass line R1 is returned to the compressor 100 after passing a heat supply means 100.

Figure 5:
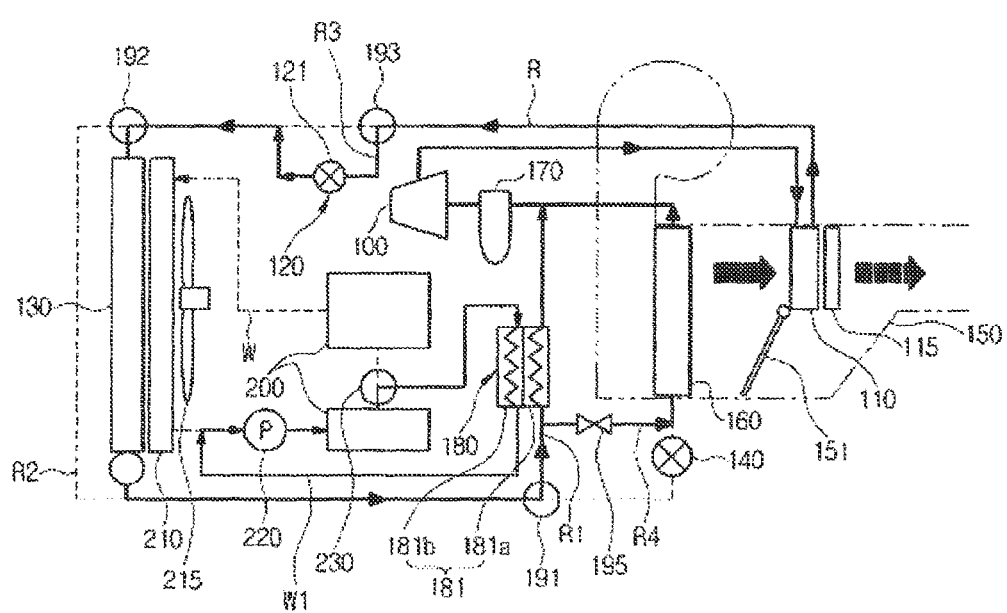
FIG. 5 is a configuration diagram showing a dehumidification mode during operation in the heat pump mode of the heat pump system.

As shown in FIG. 5, the dehumidification mode has a circulation cycle that the refrigerant discharged from the compressor 100 passes the first indoor heat exchanger 110, the second expansion means 120 and the outdoor heat exchanger 130 and flows into the first bypass line R1, and some of the refrigerant introduced into the first bypass line R1 is returned to the compressor 100 after passing the heat supply means 180 and the remainder of the refrigerant bypasses the first expansion means 140 through the branch line R4 and is returned to the compressor 100 after passing the second indoor heat exchanger 160.

Figure 6:
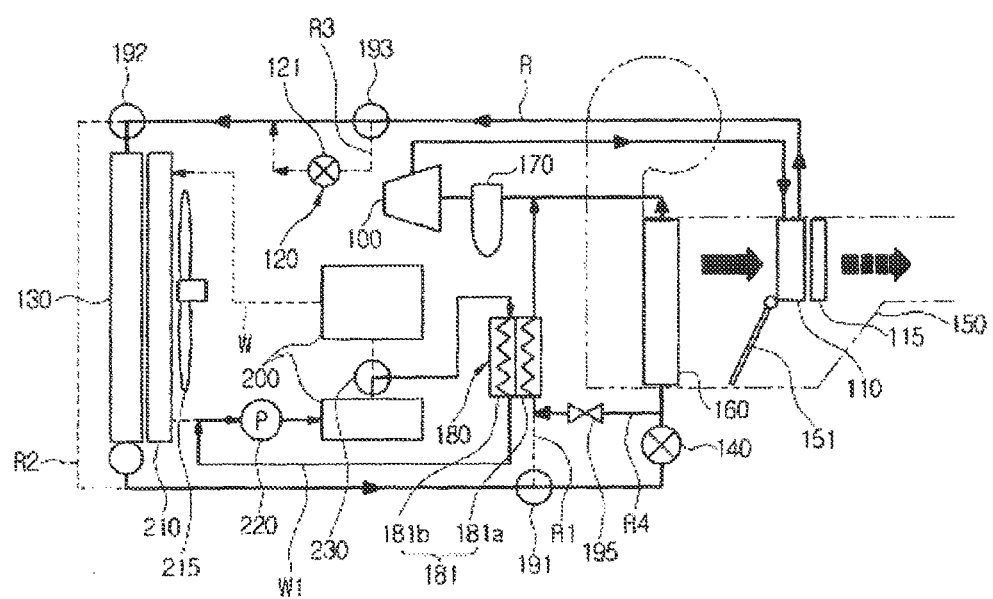
FIG. 6 is a configuration diagram showing a defrost mode during operation in the heat pump mode of the heat pump system.

As shown in FIG. 6, the defrost mode has a circulation cycle that the refrigerant discharged from the compressor 100 passes the first indoor heat exchanger 110 and the outdoor heat exchanger 130 and flows into the first expansion means 140 and is expanded, and some of the refrigerant expanded in the first expansion manes 140 is returned to the compressor 100 after passing the second indoor heat exchanger 160 and the remainder of the refrigerant is returned to the compressor 100 after passing the heat supply means 180 through the branch line R4.

Figure 4:
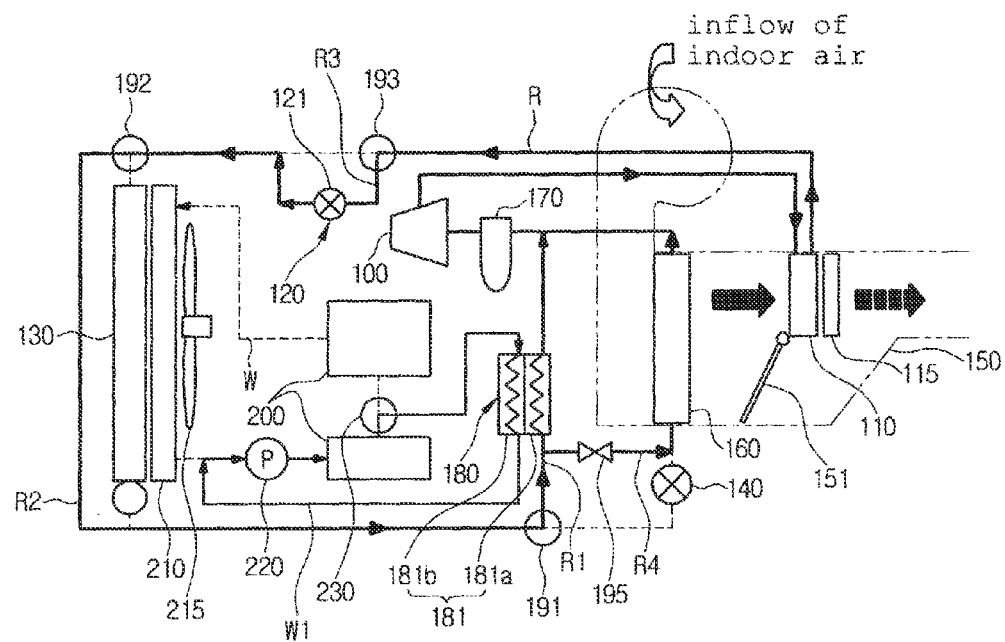
FIG. 4 is a configuration diagram showing a second heating mode during operation in the heat pump mode of the heat pump system.

As shown in FIG. 4, the second heating mode has a circulation cycle that the refrigerant discharged from the compressor 100 passes the first indoor heat exchanger 110 and the second expansion manes 120 and bypasses the outdoor heat exchanger 130 after flowing into the second bypass line R2, and some of the refrigerant, passing the second bypass line R2 flows into the first bypass line R1 and is returned to the compressor 100 after passing the heat supply means 180 and the remainder of the refrigerant, bypasses the first expansion means 140 through the branch line R4 and is returned to the compressor 100 after passing the second indoor heat exchanger 160.

Moreover, the compressor 100 mounted on the refrigerant circulation line R is actuated by receiving power from an engine (an internal combustion engine or a motor) in order to suck and compress refrigerant and discharge the refrigerant in a gas phase of high temperature and high pressure.

In the air-conditioning mode, the compressor 100 sucks and compresses the refrigerant discharged from the second indoor heat exchanger 160 and supplies the compressed refrigerant to the first indoor heat exchanger 110. In the heat pump mode, the compressor 100 sucks and compresses the refrigerant, which is discharged from the outdoor heat exchanger 130 and passes the first bypass line R1, and supplies the compressed refrigerant to the first indoor heat exchanger 110.

Furthermore, in the second heating mode, the dehumidification mode or the defrost mode during operation in the heat pump mode, refrigerant is simultaneously supplied to the first bypass line R1 and the second indoor heat exchanger 160 through the branch line R4, which will be described later, and hence, the compressor 100 sucks and compresses the refrigerant, which meets after passing the first bypass line R1 and the second indoor heat exchanger 160, and then, supplies the compressed refrigerant to the first indoor heat exchanger 110.

For your reference, the second heating mode during operation in the heat pump mode is actuated when the outdoor temperature is below zero and shows a low heating performance in comparison with the first heating mode.

The first indoor heat exchanger 110 is mounted inside the air-conditioning case 150 and connected with the refrigerant circulation line R of the outlet side of the compressor 100 to thereby exchange heat between the air flowing inside the air-conditioning case 150 and the refrigerant discharged from the compressor 100.

Additionally, the second indoor heat exchanger 160 is mounted inside the air-conditioning case 150 and connected with the refrigerant circulation line R of the inlet side of the compressor 100 to thereby exchange heat between the air flowing inside the air-conditioning case 150 and the refrigerant supplied to the compressor 100.

The first indoor heat exchanger 110 serves as the condenser (heater) in the air-conditioning mode and in the heat pump mode.

The second indoor heat exchanger 160 serves as the evaporator in the air-conditioning mode, but is stopped because refrigerant is not supplied to the second indoor heat exchanger 160 in the first heating mode during operation in the heat pump mode, but in the second heating mode, the dehumidification mode and the defrost mode, the second indoor heat exchanger 160 serves as the evaporator because some of the refrigerant is supplied to the second indoor heat exchanger 160.

In this instance, the second indoor heat exchanger 160 in the second heating mode, the dehumidification mode and the defrost mode during operation in the heat pump mode is lower in the evaporator performance than the second indoor heat exchanger 160 in the air-conditioning mode.

Moreover, the first indoor heat exchanger 110 and the second indoor heat exchanger 160 are spaced apart from each other at a predetermined interval inside the air-conditioning case 150. In this instance, the second indoor heat exchanger 160 and the first indoor heat exchanger 110 are mounted from the upstream side of an air flow direction inside the air-conditioning case 150 in order.

Therefore, in the air-conditioning mode that the second indoor heat exchanger 160 serves as the evaporator, as shown in FIG. 2, the refrigerant of low temperature and low pressure discharged from the first expansion means 140 is supplied to the second indoor heat exchanger 160, and in this instance, the air flowing inside the air-conditioning case 150 through a blower (not shown) exchanges heat with refrigerant of low temperature and low pressure flowing inside the second indoor heat exchanger 160 while passing through the second indoor heat exchanger 160 to thereby be changed into cold air, and then, the cold air is discharged to the inside of the vehicle to cool the inside of the vehicle.

In the heat pump mode (first heating mode) that the first indoor heat exchanger 110 serves as the condenser (heater), as shown in FIG. 3, the refrigerant of high temperature and high pressure discharged from the compressor 100 is supplied to the first indoor heat exchanger 110, and in this instance, the air flowing inside the air-conditioning case 150 through the blower not shown) exchanges heat with the refrigerant of high temperature and high pressure flowing inside the first indoor heat exchanger 110 while passing through the first indoor heat exchanger 110 to thereby be changed into warm air, and then, the warm air is discharged to the inside of the vehicle to heat the inside of the vehicle.

In the meantime, it is preferable that the second indoor heat exchanger 160 is larger than the first indoor heat exchanger 110.

Moreover, at the downstream side of the first indoor heat exchanger 110 inside the air-conditioning case 150, an electric heater 115 is mounted to enhance the heating performance.

In other words, the early stage of a start of the vehicle, the electric heater 115 is operated as an auxiliary heat source to enhance the heating performance. Of course, the electric heater 115 can be used not only at the early stage of the start of the vehicle but also during operation in the heat pump mode for an auxiliary heating performance.

It is preferable that the electric heater 115 is a FTC heater.

Furthermore, between the second indoor heat exchanger 160 and the first indoor heat exchanger 110 inside the air conditioning case 150, a temperature control door 151 is mounted to control a volume of air bypassing the first indoor heat exchanger 110 and a volume of air passing through the first indoor heat exchanger 110.

In this instance, in the air-conditioning mode, as shown in FIG. 2, when the front passageway of the first indoor heat exchanger 110 is completely closed by the temperature control door 151, the cold air passing through the second indoor heat exchanger 160 serving as the evaporator bypasses the first indoor heat exchanger 110 and is supplied to the inside of the vehicle, so that it can provide the maximum cooling efficiency. In the heat pump mode (first heating mode), as shown in FIG. 3, the passage bypassing the first indoor heat exchanger 110 is completely closed by the temperature control door 151, all airs are changed into warm airs while passing through the first indoor heat exchanger 110 serving as the condenser (heater) and the warm air is supplied to the inside of the vehicle, so that it can provide the maximum heating efficiency.

Meanwhile, temperature of the air discharged to the inside of the vehicle can be properly controlled when the position of the temperature control door 151 is regulated. For instance, in the air-conditioning mode, when the temperature control door 151 is actuated to open all of the passages bypassing the first indoor heat exchanger 110 and passing through the first indoor heat exchanger 110, some of the cold air passing through the second indoor heat exchanger 160 bypasses the first indoor heat exchanger 110 and the remainder of the cold air is changed into warm air while passing through the first indoor heat exchanger 110. After that, the cold air and the warm air are mixed together to properly control the indoor temperature of the vehicle. In addition, the air carries out dehumidification work while passing through the second indoor heat exchanger 160 serving as the evaporator.

Moreover, not only in the air-conditioning mode but also in the second heating mode, the dehumidification mode and the defrost mode that some of the refrigerant is supplied to the second indoor heat exchanger 160, during operation in the heat pump mode, the second indoor heat exchanger 160 serves as the evaporator to dehumidify the inside of the vehicle.

As described above, the heat pump system according to the present invention can carry out the dehumidification function inside the vehicle not only in the air-conditioning mode but also in the heat pump mode.

Furthermore, the outdoor heat exchanger 130 is mounted on the outside of the air-conditioning case 150 and connected with the refrigerant circulation line R to exchange heat between the refrigerant circulating the refrigerant circulation line R and the outdoor air.

Here, the outdoor heat exchanger 130 is mounted in front of an engine room of the vehicle to exchange heat between the refrigerant flowing inside the outdoor heat exchanger 130 and the outdoor air.

In the air-conditioning mode, the outdoor heat exchanger 130 serves as the condenser like the first indoor heat exchanger 110, and in this instance, the refrigerant of high temperature flowing inside the outdoor heat exchanger 130 exchanges heat with the outdoor air, and then, is condensed.

Additionally, in the heat pump mode (first heating mode), the outdoor heat exchanger 130 serves as the evaporator, which is contrary to the first indoor heat exchanger 110, and in this instance, the refrigerant of low temperature flowing inside the outdoor heat exchanger 130 exchanges heat with the outdoor air to be evaporated.

Moreover, the first expansion means 140 is mounted on the refrigerant circulation line R of the inlet side of the second indoor heat exchanger 160 to expand the refrigerant supplied to the second indoor heat exchanger 160.

That is, the first expansion means 140 expands the refrigerant discharged from the outdoor heat exchanger 130 to make the refrigerant into a liquid phase of low temperature and low pressure (wet saturation), and then, supplies the refrigerant of the liquid phase to the second indoor heat exchanger 160.

In the meantime, in the defrost mode during operation in the heat pump mode or at below zero temperatures, because the first expansion means 140 mounted at the inlet side of the second indoor heat exchanger 160 serving as the evaporator may be out of control due to supercooling, it is preferable that the first expansion means 140 is an expansion valve which may function as an orifice.

The expansion valve, which is the first expansion means 140, includes: a main body 141 having a first flow channel 142 having an orifice portion 142a to expand the refrigerant supplied to the second indoor heat exchanger 160 and a second flow channel 143 in which the refrigerant discharged from the second indoor heat exchanger 160 flows; a valve body 144 seated on one side of the orifice portion 142a to control the degree of opening of the orifice portion 142a; and a refrigerant flowing portion 142h formed on the seat face of the orifice portion 142a to flow a predetermined amount of the refrigerant even in a state where the valve body 144 is seated on the seat face of the orifice portion 142a.

In this instance, because the refrigerant flowing portion 142b functions as the orifice, the valve body 144 is seated on the orifice portion 142a of the first flow channel 142, and hence, the refrigerant can flow through the refrigerant flowing portion 142b even though the orifice portion 142a is closed, and during the above process, the refrigerant is expanded.

As described above, in the defrost mode or at below zero temperatures, even though the expansion valve 140 is out of control due to supercooling, because the refrigerant flowing portion 142b functions as the orifice so that the refrigerant can always flow and be expanded, the heat pump mode can be operated smoothly and waste heat can be collected so that the heating performance can be enhanced.

Meanwhile, a diaphragm 145 displaced according to changes in temperature of the refrigerant flowing inside the second flow channel 143 is mounted at an upper end portion of the main body 141, and a rod 146 that actuates the valve body 144 according to the displacement of the diaphragm 145 is mounted beneath the diaphragm 145.

Furthermore, the first bypass line R1 is mounted to connect the refrigerant circulation line R of the inlet side of the first expansion means 140 with the refrigerant circulation line R of the outlet side of the second indoor heat exchanger 160, so that the circulation refrigerant bypasses the first expansion means 140 and the second indoor heat exchanger 160.

As shown in the drawings, the first bypass line R1 is arranged in parallel with the first expansion means 140 and the second indoor heat exchanger 160, namely, the inlet side of the first bypass line R1 is connected with the refrigerant circulation line R that connects the outdoor heat exchanger 130 and the first expansion means 140 with each other, and the outlet side of the first bypass line R1 is connected with the refrigerant circulation line R that connects the second indoor heat exchanger 160 and the compressor 100 with each other.

Thereby, in the air-conditioning mode, the refrigerant passing through the outdoor heat exchanger 130 flows toward the first expansion means 140 and the second indoor heat exchanger 160, but in the heat pump mode (first heating mode), the refrigerant passing through the outdoor heat exchanger 130 directly flows toward the compressor 103 through the first bypass line R1, and then, bypasses the first expansion means 140 and the second indoor heat exchanger 160.

Here, a conversion of the flow direction of the refrigerant according to the air-conditioning mode and the heat pump mode is carried out by the first direction-switching valve 191.

The first direction-switching valve 191 is mounted at a branch point between the first bypass line R1 and the refrigerant circulation line R to thereby convert, the flow direction of the refrigerant so that the refrigerant passing through the outdoor heat exchanger 130 flows toward the first bypass line R1 and the first expansion means 140.

In this instance, in the air-conditioning mode, the first direction-switching valve 191 converts the flow direction of the refrigerant in such a way that the refrigerant, which is discharged from the compressor 100 and passes through the first indoor heat exchanger 110 and the outdoor heat exchanger 130, flows toward the first expansion means 140 and the second indoor heat exchanger 160. But, in the heat pump mode (first heating mode), the first direction-switching valve 191 converts the flow direction of the refrigerant in such a way that the refrigerant, which is discharged from the compressor 100 and passes through the first indoor heat exchanger 110, the second expansion means 120 and the outdoor heat exchanger 130 flows toward the first bypass line R1.

In the meantime, it is preferable that the first direction-switching valve 191 is mounted at the branch point of the inlet side of the first bypass line R1 and is a three-way valve.

Moreover, the second expansion means 120 is mounted on the refrigerant circulation line R of the inlet side of the outdoor heat exchanger 130 to selectively expand the refrigerant supplied to the outdoor heat exchanger 130 according to the air-conditioning mode or the heat pump mode.

The second expansion means 120 includes: the expansion line R3 connected on the refrigerant circulation line R of the inlet side of the outdoor heat exchanger 130 in parallel, the orifice 121 mounted on the expansion line R3 for expanding the refrigerant; and a third direction-switching valve 193 mounted at the branch point between the expansion line R3 and the refrigerant circulation line R to convert the flow direction of the refrigerant so that the refrigerant passing through the first indoor heat exchanger 110 passes through the orifice 121 or bypasses the orifice 121 according to the air-conditioning mode or the heat pump mode.

Here the orifice 121 may be an expansion valve like the first expansion means 140.

Accordingly, in the air-conditioning mode, the refrigerant that is discharged from the compressor 100 by the third direction-switching valve 193 and passes through the first indoor heat exchanger 110 bypasses the orifice 121, and then, is supplied to the outdoor heat exchanger 130.

In the heat pump mode (first heating mode), the refrigerant that is discharged from the compressor 100 by the third direction-switching valve 193 and passes through the first indoor heat exchanger 110 is expanded while passing through the orifice 121, and then, is supplied to the outdoor heat exchanger 130.

Furthermore, a heat supply means 180 is mounted on the first bypass line R1 to supply heat to the refrigerant flowing along the first bypass line R1.

The heat supply means 180 comprises a water-cooled type heat exchanger 181 including: a refrigerant heat exchanging part 181a allowing the refrigerant flowing along the first bypass line R1 to flow therein in order to supply the waste heat of vehicle electric devices 200 to the refrigerant flowing along the first bypass line R1; and a cooling water heat exchanging part 181b disposed on one side of the refrigerant heat exchanging part 181a in a heat-exchangeable manner and allowing the cooling water circulating the vehicle electric devices 200 to flow therein.

Accordingly, in the heat pump mode, the heat pump system according to the present invention can enhance the heating performance by collecting heat sources from the waste heat of the vehicle electric devices 200.

Meanwhile, for the vehicle electric devices 200, there are motors, inverters, and others.

Here, the heat supply means 180 will be described in more detail. The heat supply means 180 includes a cooling water circulation line W, a water-cooled type radiator 210, a cooling water bypass line W1, and a cooling water direction-switching valve 230.

The cooling water circulation line W connects the vehicle electric devices 200 and the water-cooled type radiator 210 with each other to circulate cooling water to the vehicle electric devices 200.

In this instance, a water pump 220 for circulating the cooling water is disposed on the cooling water circulation line W.

In the drawings, two electric devices 200 are connected on the cooling water circulation line W, but the number of the electric devices 200 may be varied.

The water-cooled type radiator 210 is mounted on the cooling water circulation line W to exchange heat between the outdoor air and the cooling water circulating the cooling water circulation line W in order to cool the vehicle electric devices 200 by cooling the cooling water circulating the cooling water circulation line W.

In this instance, a blast fan 215 is mounted on one side of the water-cooled type radiator 210 to blow the outdoor air toward the water-cooled type radiator 210, so that the cooling performance of the cooling water circulating the cooling water circulation line W is enhanced.

The cooling water bypass line W1 connects the cooling water circulation line W and the cooling water heat exchanging part 181*b* of the water-cooled type heat exchanger 181 with each other in parallel, so that the cooling water passing the electric devices 200 through the water pump 220 bypasses the water-cooled type radiator 210 and flows to the cooling water heat exchanging part 181*b*.

Furthermore, the cooling water direction-switching valve 230 is mounted at the branch point between the cooling water bypass line W1 and the cooling water circulation line W to convert a flow direction of the cooling water according to the air-conditioning mode or the heat pump mode.

Accordingly, in the heat pump mode, the cooling water passing the electric devices 200 by operation of the water pump 220 bypasses the water-cooled type radiator 210 by the cooling water direction-switching valve 230 and flows into the cooling water heat exchanging part 181*b* of the water-cooled type heat exchanger 181, and in this process, the cooling water flowing in the cooling water heat exchanging part 181*b* and the refrigerant flowing in the refrigerant heat exchanging part 181*a* along the first bypass line R1 exchange heat with each other so that the waste heat of the vehicle electric devices 200 can be collected.

In the air-conditioning mode, the cooling water passing the electric devices 200 by operation of the water pump 220 circulates the water-cooled type radiator 210 by the cooling water direction-switching valve 230, and in this process, the circulating cooling water is cooled by heat exchange with the outdoor air so that the electric devices 200 can be cooled.

In the meantime, the drawings illustrates that the cooling water direction-switching valve 230 is mounted between the two electric devices 200 to collect the waste heat of the first electric device 200 in the flow direction of the cooling water, but if the cooling water direction-switching valve 230 is mounted at an outlet side of the second electric device 200, the waste heat of the two electric devices 200 can be collected.

Furthermore, in order to flow some of the refrigerant, which is supplied to the heat supply means 180 of the first bypass line R1, toward the second indoor heat exchanger 160 or to flow some of the refrigerant, which is supplied to the second indoor heat exchanger 160, toward the heat supply means 180 of the first bypass line R1, the branch line R4 for connecting the refrigerant circulation line R of the inlet side of the second indoor heat exchanger 160 with the first bypass line R1 of the inlet side of the water-cooled type heat exchanger 181 of the heat supply means 180 is mounted, and the flow control valve 195 for controlling the amount of the refrigerant is mounted on the branch line R4.

In more detail, the branch line R4 is mounted to connect the refrigerant circulation line R, which is located between the first expansion means 140 and the second indoor heat exchanger 160, with the first bypass line R1 of the inlet side of the heat supply means 180.

Now, the second heating mode, the dehumidification mode, and the defrost mode during operation in the heat pump mode using the branch line R4 and the flow control valve 195 will be described.

First, in the second heating mode during operation in the heat pump mode, as shown in FIG. 4, some of the refrigerant flowing toward the first bypass line R1 by the first direction-switching valve 191 collects the waste heat of no vehicle electric devices 200 while passing the water-cooled type heat exchanger 181, and the remainder passes the second indoor heat exchanger 160 serving as the evaporator.

The second heating mode illustrated in FIG. 4 is carried out at outdoor temperatures below zero. In this mode, in order to minimize influences of the outdoor air of low temperature, the refrigerant bypasses the outdoor heat exchanger 130 through the second bypass line R2, which will be described later. In this instance, in order to enhance the heating efficiency by collecting the waste heat of the vehicle electric devices 200 and the heat sources of the indoor air, the refrigerant flowing in the first bypass line R1 branched through the branch line R4, and then, the branched refrigerants are simultaneously supplied to the water-cooled type heat exchanger 181 and the second indoor heat exchanger 160. Here, the second heating mode is controlled to an indoor air inflow mode that the indoor air is introduced into the air-conditioning case 150 and exchanges heat with the second indoor heat exchanger 160.

Moreover, in the dehumidification mode during operation of the heat pump mode, as shown in FIG. 5, some of the refrigerant flowing toward the first bypass line R1 by the first direction-switching valve 191 collects the waste heat of the vehicle electric devices 200 while passing through the water-cooled type heat exchanger 181, and the remainder passes through the second indoor heat exchanger 160 serving as the evaporator.

The dehumidification mode illustrated in FIG. 5 is carried out at outdoor temperatures above zero. The refrigerant passing through the outdoor heat exchanger 130 to collect the heat sources of the outdoor air and the waste heat of the vehicle electric devices 200 passes the water-cooled type heat exchanger 181 while flowing in the first bypass line R1, and in this instance, some of the refrigerant flowing in the first bypass line R1 is branched through the branch line R4 and supplied to the second indoor heat exchanger 160 to thereby dehumidify the air flowing inside the air-conditioning case 150.

Furthermore, in the defrost mode during operation in the heat pump mode, as shown in FIG. 6, the refrigerant flows toward the first expansion means 140 by the first direction-switching valve 191, and in this instance, some of the refrigerant passing the first expansion means 140 passes the second indoor heat exchanger 160 serving as the evaporator, and the remainder passes the water-cooled type heat exchanger 181 to collect the waste heat of the vehicle electric devices 200.

The defrost mode illustrated in FIG. 6 is carried out to remove frost of the outdoor heat exchanger 130, which serves as the evaporator in the first heating mode. In the air-conditioning mode as shown in FIG. 2, refrigerant of high temperature is supplied to the outdoor heat exchanger 130 to thereby remove frost, and in this instance, some of the refrigerant passing the first expansion means 140 after passing the outdoor heat exchanger 130 is branched through the branch line R4 and supplied to the water-cooled type heat exchanger 181 to thereby degrade the performance of the second indoor heat exchanger 160 serving as the evaporator, so that a change in temperature of the indoor air during operation in the defrost mode can be minimized.

Additionally, in the dehumidification mode and the defrost mode during operation in the heat pump mode, the amount of the refrigerant supplied to the second indoor heat exchanger 160 serving as the evaporator to minimize the change in temperature of the indoor air is properly controlled by the flow control valve 195.

In the meantime, the water-cooled type heat exchanger 181 mounted on the first bypass line R1 is mounted lower than the branch line R4 in the refrigerant flow direction of the first bypass line R1.

Here, the reason why the water-cooled type heat exchanger 181 is mounted lower than the branch line R4 on the first bypass line R1 will be described by each mode.

First, in the air-conditioning mode, when the water-cooled type heat exchanger 181 is mounted on the refrigerant circulation line R, the cooling efficiency is lowered due to heating of the refrigerant, and hence, the water-cooled type heat, exchanger 181 must be mounted on the first bypass line R1 where the refrigerant does not flow in the air-conditioning mode.

In the second heating mode and the dehumidification mode, collection of the waste heat can be increased when the refrigerant introduced into the first bypass line R1 is branched through the branch line R4 and the branched refrigerants are respectively supplied to the water-cooled type heat exchanger 181 and the second indoor heat exchanger 160. If the water-cooled type heat exchanger 181 first collects heat before the refrigerant is supplied to the second indoor heat exchanger 160, the heat-exchange efficiency between the second indoor heat exchanger 160 and the air is lowered, and hence, the water-cooled type heat exchanger 181 must be mounted lower than the branch line R4 on the first bypass line R1.

In the defrost mode, because the refrigerant works in the air-conditioning mode, the water-cooled type heat exchanger 181 must be mounted lower than the branch line R4 on the first bypass line R1 where the refrigerant of low temperature and low pressure passing through the first expansion valve 140, and in this instance, when a great deal of refrigerant flows toward the second indoor heat exchanger 160 in the defrost mode, because there may occur a great change in the indoor temperature, a fixed quantity of the refrigerant must be bypassed toward the water-cooled type heat exchanger 181 by the branch line R4.

Moreover, the second bypass line R2 is mounted on the refrigerant circulation line R in parallel so that the refrigerant passing the second expansion means 120 bypasses the outdoor heat exchanger 130, and the second direction-switching valve 192 is mounted at the branch point between the second bypass line R2 and the refrigerant circulation line R to convert the flow direction of the refrigerant, so that the refrigerant passing the second expansion valve 120 flows to the outdoor heat exchanger 130 or the second bypass line R2 according to the outdoor temperature.

In other words, if the outdoor temperature is above zero, the refrigerant is controlled by the second direction-switching valve 192 to flow toward the outdoor heat exchanger 130, and if the outdoor temperature is below zero, the refrigerant is controlled by the second direction-switching valve 192 to bypass the outdoor heat exchanger 130 and flow toward the second bypass line R2.

Here, in the case that the outdoor temperature is below zero, in order to minimize the influences of the outdoor air of low temperature, like in the second heating mode illustrated in FIG. 4, the refrigerant passing the second expansion means 120 bypasses the outdoor heat exchanger 130 and flows toward the second bypass line R2, and some of the refrigerant passing the second bypass line R2 is supplied to the water-cooled type heat exchanger 131 to collect the waste heat of the vehicle electric devices 200 while flowing in the first bypass line R1 and the remainder is supplied to the second indoor heat exchanger 160, which serves as the evaporator, through the branch line R4.

In this instance, the second heating mode is controlled to an indoor air inflow mode that the indoor air is introduced into the air-conditioning case 150 and exchanges heat with the second indoor heat exchanger 160, so that the refrigerant supplied to the second indoor heat exchanger 160 can collect the heat sources of the indoor air.

As described above, in the low heat source condition that the outdoor temperature is below zero, the refrigerant bypasses the outdoor heat exchanger 130 through the second bypass line R2 to thereby minimize the influences of the outdoor air of low temperature, and the refrigerant flowing in the first bypass line R1 is branched through the branch line so that some of the refrigerant collects the waste heat of the vehicle electric devices 200 through the water-cooled type heat exchanger 181 and the remainder collects the heat sources of the indoor air through the second indoor heat exchanger 160, which exchanges heat with the indoor air, whereby the heating efficiency can be enhanced.

Meanwhile, the control part actuates the electric heater 115 to carry out an initial heating when the outdoor temperature and the indoor temperature are all below the reference temperature (0° C.) after the start of the vehicle, and then, controls the air inflow mode into the indoor air inflow mode in such a way that the indoor air can be introduced into the air-conditioning case 150 and operates the second heating mode as shown in FIG. 4 when the indoor temperature is above the reference temperature (0° C.)

As described above, the heat pump system according to the present invention collects the waste heat of the vehicle electric devices 200 and the heat sources of the outdoor air when the outdoor temperature is above zero, and collects the waste heat of the vehicle electric devices 200 and the heat sources of the indoor air when the outdoor temperature is below zero, and can realize various kinds of heat pump modes, such as the first heating mode (in FIG. 3), the second heating mode (in FIG. 4), the dehumidification mode (in FIG. 5), and the defrost mode (in FIG. 6), according to thermal loads and purposes, so that the heat pump system can keep the advanced heating performance by enhancing the efficiency of the heat pump system and increase the mileage of the vehicle (electric vehicles or hybrid vehicles) by minimizing the operation of the electric heater 115.

Figure 7:
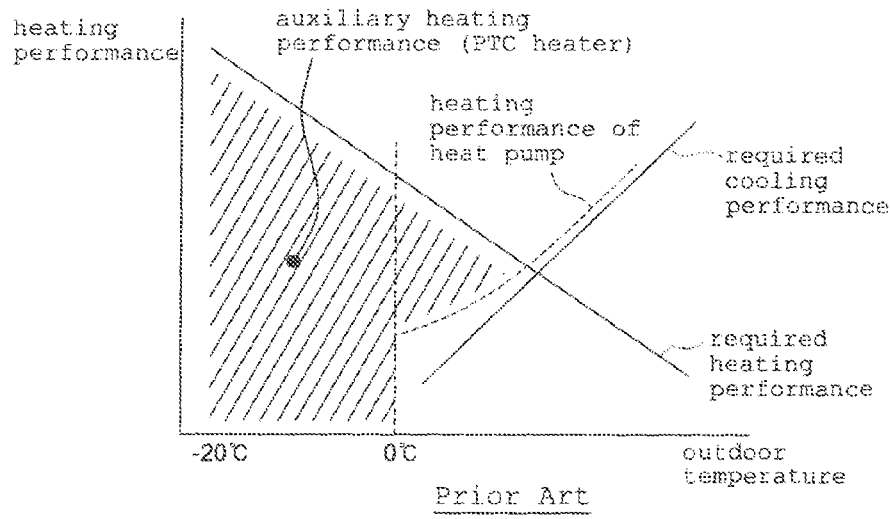
FIG. 7 is a graph showing heating performances by outdoor temperature of the heat pump system according to the prior art and the heat pump system.
Figure 7:
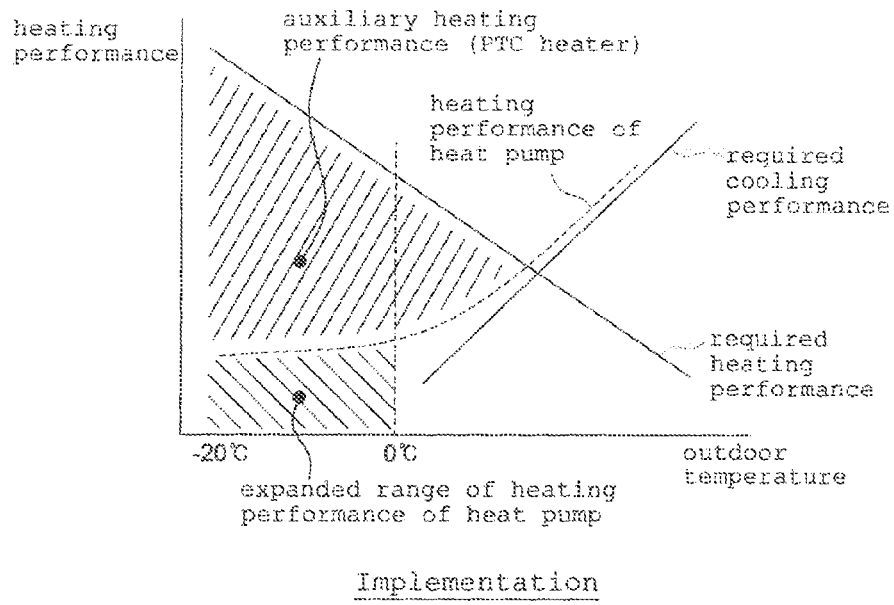
Figure 8:
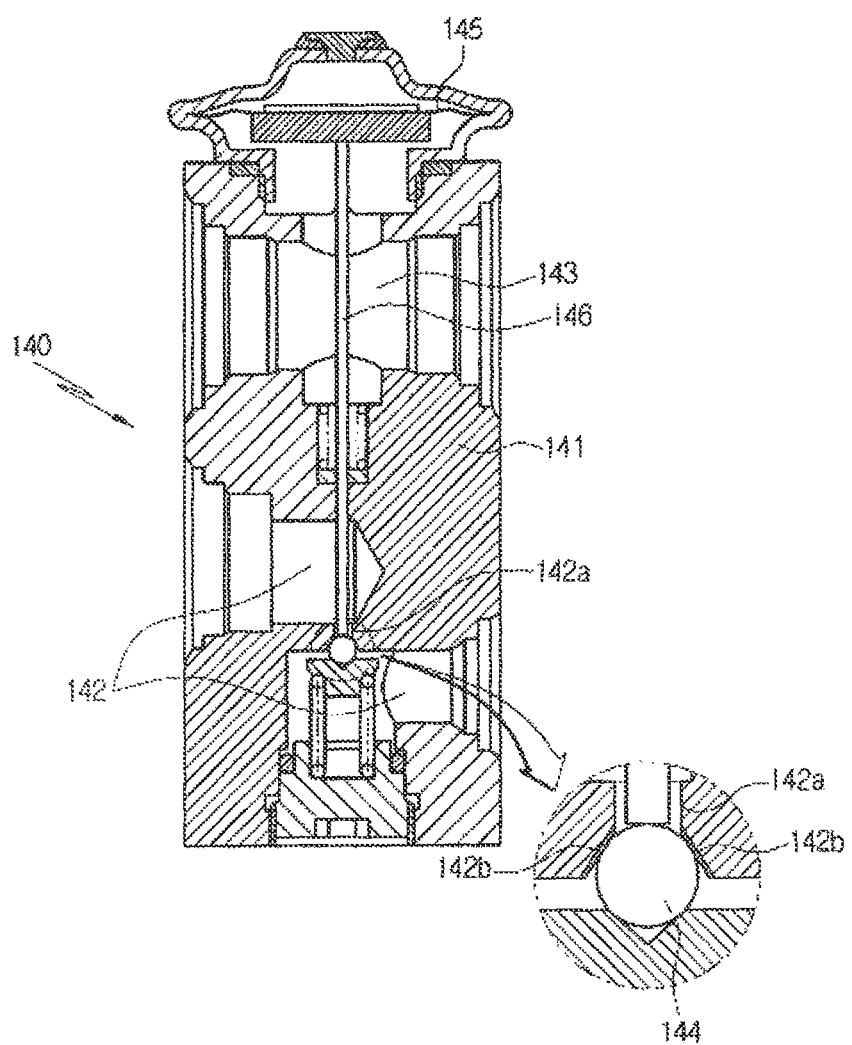
FIG. 8 is a sectional view of a first expansion means of the heat pump system for the vehicle.

FIG. 7 is a graph showing heating performances of the heat pump system according to the prior art and the heat pump system according to the present invention by the outdoor temperature. As shown in the drawing, the higher the outdoor temperature is, the better the required cooling performance and the lower the outdoor temperature is, the better the required heating performance is.

Here, because the heat pump system according to the prior art is not operated in the heat pump mode when the outdoor temperature is below zero, a PTC heater functioning as an auxiliary heater carries out heating with power consumption of 100% when the outdoor temperature is below zero. So, the heat pump system according to the prior art has several problems in that it can carry out heating in the heat pump mode only when the outdoor temperature is above zero to thereby deteriorate the efficiency of the heat pump system, and in that power consumption increases rapidly and the mileage of the vehicle is reduced because the heat pump system can carry out heating only by the PTC heater when the outdoor temperature is below zero.

On the other hand, because the heat pump system according to the present invention can work in the heat pump mode even though the outdoor temperature is below zero, the heat pump mode can substitute for a partial area ("improved effect" part) of the part where the PTC heater according to the prior art has carried out heating with the power consumption of 100% when the outdoor temperature is below zero, so that the heat pump system according to the present invention can reduce the power consumption of the PTC heater as much as the improved effect part and increase the mileage of the vehicle.

In the meantime, an accumulator 170 is mounted on the refrigerant circulation line R of the inlet side of the compressor 100.

The accumulator 170 divides the refrigerant supplied to the compressor 100 into a liquid phase refrigerant and gas phase refrigerant, and then, supplies just the gas phase refrigerant to the compressor 100.

Hereinafter, actions of the heat pump system for the vehicle according to the present invention will be described.

Air-Conditioning Mode (Cooling Mode)

In the air-conditioning mode (cooling mode), as shown in FIG. 2, the first bypass line R1 is closed by the first direction-switching valve 191 and the second bypass line R2 is closed by the second direction-switching valve 192, and then, the third direction-switching valve 193 closes the expansion line R3.

Furthermore, the cooling water direction-switching valve 230 closes the cooling water bypass line so that the cooling water circulating through the water pump 220 cools the vehicle electric devices 200 while circulating the vehicle electric devices 200 and the water-cooled radiator.

Meanwhile, at the maximum heating, the temperature control door 151 inside the air-conditioning case 150 closes the passage passing the first indoor heat exchanger 110 (condenser), and then, the air blown into the air-conditioning case 150 by the blower is cooled while passing the second indoor heat exchanger 160 (evaporator). After that, the cooled air bypasses the first indoor heat exchanger 110 and is supplied to the inside of the vehicle to cool the inside of the vehicle.

Continuously, the refrigerant circulation process will be described.

The gas phase refrigerant of high temperature and high pressure that is compressed in the compressor 100 and is discharged from the compressor 100 is supplied to the first indoor heat exchanger 110 (condenser) mounted inside the air-conditioning case 150.

As shown in FIG. 2, the refrigerant supplied into the first indoor heat exchanger 110 directly flows to the outdoor heat exchanger 130 (condenser) without any heat-exchange with the air because the temperature control door 151 closes the passage of the first indoor heat exchanger 110.

The refrigerant flowing to the outdoor heat exchanger 130 is condensed while exchanging heat with the outdoor air, and hence, the gas phase refrigerant is changed into liquid phase refrigerant.

Meanwhile, the first indoor heat exchanger 110 and the outdoor heat exchanger 130 all serve as the condenser, but the outdoor heat exchanger 130 which exchanges heat with the outdoor air mainly condenses the refrigerant.

Continuously, the refrigerant passing the outdoor heat exchanger 130 is expanded by decompression while passing through the first expansion means 140 to thereby become a liquid phase refrigerant of low temperature and low pressure, and then, the liquid phase refrigerant, is introduced into the second indoor heat exchanger (evaporator).

The refrigerant introduced into the second indoor heat exchanger 160 is evaporated through heat-exchange with the air blown into the air-conditioning case 150 by the blower, and at the same time, cools the air through a heat absorption action by latent heat of vaporization of the refrigerant, and then, the cooled air is supplied to the inside of the vehicle to cool the inside of the vehicle.

After that, the refrigerant discharged from the second indoor heat exchanger 160 is introduced into the compressor 100, and then, circulates the above-mentioned cycle.

First Heating Mode During Operation in the Heat Pump Mode

The first heating mode during operation in the heat pump mode is carried out in the condition that the outdoor temperature is above zero and the first heating mode uses the waste heat of the vehicle electric devices 200 as heat sources. As shown in FIG. 3, the first bypass line R1 is opened by the first direction-switching valve 191, and the refrigerant is not supplied to the first expansion means 140 and the second indoor heat exchanger 160.

Moreover, the second bypass line R2 is closed by the second direction-switching valve 192, and the expansion line R3 is opened by the third direction-switching valve 193.

In the meantime, when the cooling water direction-switching valve 230 opens the cooling water bypass line W1, the cooling water circulating through the water pump 220 passes the vehicle electric devices 200 and flows to the cooling water heat exchanging part 181b of the water-cooled type heat exchanger 181, and then, continuously circulates. In this instance, the cooling water heated by the vehicle electric devices 200 flows to the cooling water heat exchanging part 131b of the water-cooled type heat exchanger 181.

Furthermore, in the first heating mode, the temperature control door 151 inside the air-conditioning case 150 closes the passage bypassing the first indoor heat exchanger 110 (condenser), and hence, the air blown into the air-conditioning case 150 by the blower is changed into warm air while passing the first indoor heat exchanger 110 after passing the second indoor heat exchanger 160 (stop of working), and then, is supplied to the inside of the vehicle to heat the inside of the vehicle.

Continuously, the refrigerant circulation process will be described.

The gas phase refrigerant of high temperature and high pressure that is compressed in the compressor 100 and is discharged from the compressor 100 is introduced into the first indoor heat exchanger 110 (condenser) mounted inside the air-conditioning case 150.

The gas phase refrigerant of high temperature and high pressure introduced into the first indoor heat exchanger 110 is condensed while exchanging heat with the air blown into the air-conditioning case 150 by the blower, and in this instance, the air passing the first indoor heat exchanger 110 is changed into warm air, and then, the warm air is supplied to the inside of the vehicle to heat the inside of the vehicle.

Continuously, the refrigerant discharged from the first indoor heat exchanger 110 flows to the expansion line R3 through the third direction-switching valve 193, and the refrigerant flowing to the expansion line R3 is expanded by decompression while passing the orifice 121, which is the second expansion means 120, to thereby become a liquid phase refrigerant of low temperature and low pressure, and then, the liquid phase refrigerant is supplied to the outdoor heat exchanger 130 (evaporator).

The refrigerant supplied to the outdoor heat exchanger 130 is evaporated through heat-exchange with the outdoor air, and then, passes the first bypass line R1 by the first direction-switching valve 191. In this instance, the refrigerant passing the first bypass line R1 exchanges heat with the cooling water passing the cooling water heat exchanging part 181b while passing the refrigerant heat exchanging part 181a of the water-cooled type heat exchanger 181 to thereby collect the waste heat of the vehicle electric devices 200. After that, the refrigerant is introduced into the compressor 100, and then, recirculates in the above-mentioned cycle.

Second Heating Mode During Operation in Heat Pump Mode

The heating mode during operation in the heat pump mode is carried out when the outdoor temperature is below zero and uses the indoor air and the waste heat of the vehicle electric devices 200 as heat sources. As shown in FIG. 4, the first bypass line R1 is opened by the first direction-switching valve 191, and the branch line R4 is opened by the flow control valve 195.

Furthermore, the second bypass line R2 is opened by the second direction-switching valve 192, and the expansion line R3 is opened by the third direction-switching valve 193.

Additionally, when the cooling water direction-switching valve 230 opens the cooling water bypass line W1, the cooling water circulating through the water pump 220 passes the vehicle electric devices 200, and then, flow to the cooling water heat exchanging part 181b of the water-cooled type heat exchanger 181. After that, the cooling water circulates continuously. In this instance, the cooling water heated by the vehicle electric devices 200 flows to the cooling water heat exchanging part 181b of the water-cooled type heat exchanger 181.

In the meantime, when the indoor temperature of the vehicle is above zero, the air inflow mode of the air-conditioning case 150 is controlled into the indoor air inflow mode so that the indoor air is introduced into the air-conditioning case 150.

Moreover, in the second heating mode, the temperature control door 151 inside the air-conditioning case 150 closes the passage bypassing the first indoor heat exchanger 110 (condenser), and hence, the air blown into the air-conditioning case 150 by the blower is changed into warm air while passing the first indoor heat exchanger 110 after passing the second indoor heat exchanger 160 (stop of working), and then, is supplied to the inside of the vehicle to heat the inside of the vehicle.

Continuously, the refrigerant circulation process will be described.

The gas phase refrigerant of high temperature and high pressure that is compressed in the compressor 100 and is discharged from the compressor 100 is introduced into the first indoor heat exchanger 110 (condenser) mounted inside the air-conditioning case 150.

The gas phase refrigerant of high temperature and high pressure introduced into the first indoor heat exchanger 110 is condensed while exchanging heat with the air blown into the air-conditioning case 150 by the blower, and in this instance, the air passing the first indoor heat exchanger 110 is changed into warm air, and then, the warm air is supplied to the inside of the vehicle to heat the inside of the vehicle.

Continuously, the refrigerant discharged from the first indoor heat exchanger 110 flows to the expansion line R3 through the third direction-switching valve 193, and the refrigerant flowing to the expansion line R3 is expanded by decompression while passing the orifice 121, which is the second expansion means 120 to thereby become a liquid phase refrigerant of low temperature and low pressure, and then, the liquid phase refrigerant bypasses the outdoor heat exchanger 130 while flowing to the second bypass line R2.

In this instance, because the refrigerant bypasses the outdoor heat exchanger 130, it minimizes the influences of the outdoor air of low temperature.

After that, the refrigerant passing the second bypass line R2 passes the first bypass line R1 by the first direction-switching valve 191, and in this instance, some of the refrigerant passing the first bypass line R1 exchanges heat with the cooling water, which passes the cooling water heat exchanging part 181b, while passing the refrigerant heat exchanging part 181a of the water-cooled type heat exchanger 181 and is evaporated while collecting the waste heat of the vehicle electric devices 200, and the remainder of the refrigerant is supplied to the second indoor heat exchanger 160 through the branch line R4 and is evaporated while exchanging heat with the indoor air that flows inside the air-conditioning case 150.

The refrigerants respectively passing the water-cooled type heat exchanger 181 and the second indoor heat exchanger 160 are joined together and introduced into the compressor 100, and then, recirculate in the above-mentioned cycle.

Dehumidification Mode During Operation in Heat Pump Mode

The dehumidification mode during operation in the heat pump mode is carried out when the outdoor temperature is above zero and uses the outdoor air and the waste heat of the vehicle electric devices 200 as heat sources. As shown in FIG. 5, the dehumidification mode is carried out in the case that there is a need to dehumidify the inside of the vehicle during operation in the first heating mode illustrated in FIG. 3.

Accordingly, just parts of the dehumidification mode different from the first heating mode of FIG. 3 will be described.

In the dehumidification mode, the branch line R4 is additionally opened by the flow control valve 195 in the state of the first heating mode.

Moreover, in the dehumidification mode, when the temperature control door 151 inside the air-conditioning case 150 closes the passage bypassing the first indoor heat exchanger 110 (condenser), the air blown into the air-conditioning case 150 by the blower is cooled while passing the second indoor heat exchanger (evaporator), and then, is changed into warm air while passing the first indoor heat exchanger 110. The warm air is supplied to the inside of the vehicle to heat the inside of the vehicle.

In this instance, because the amount of the refrigerant supplied to the second indoor heat exchanger 160 is small, the air cooling efficiency becomes low, and hence, the heat pump system according to the present invention can minimize the change in the indoor temperature and smoothly dehumidify the air passing the second indoor heat exchanger 160.

Continuously, the refrigerant circulation process will be described.

The refrigerant passing the compressor 100, the first indoor heat exchanger 110, the orifice 121 of the second expansion means 120, and the outdoor heat exchanger passes the first bypass line R1 by the first direction-switching valve 191, and in this instance, some of the refrigerant passing the first bypass line R1 exchanges heat with the cooling water, which passes the cooling water heat exchanging part 181b, while passing the refrigerant heat exchanging part 181a of the water-cooled type heat exchanger 181 and is evaporated while collecting the waste heat of the vehicle electric devices 200, and the remainder of the refrigerant is supplied to the second indoor heat exchanger 160 through the branch line R4 and is evaporated while exchanging heat with the air flowing inside the air-conditioning case 150.

During the above process, the air passing the second indoor heat exchanger 160 can be dehumidified, and the dehumidified air passing the second indoor heat exchanger 160 is changed into warm air while passing the first indoor heat exchanger 110 (condenser), and then, is supplied to the inside of the vehicle to thereby dehumidify and heat the inside of the vehicle.

After that, the refrigerants respectively passing the water-cooled type heat exchanger 181 and the second indoor heat exchanger 160 are joined together and introduced into the compressor 100, and then, recirculate in the above-mentioned cycle.

Defrost Mode During Operation in Heat Pump Mode

The defrost mode during operation in the heat pump mode is carried out when the outdoor temperature is above zero, and uses the outdoor air and the waste heat of the vehicle electric devices 200 as heat sources. As shown in FIG. 2, the defrost mode is carried out when there is a need to remove frost due to freezing of the outdoor heat exchanger 130.

If it is necessary to remove frost of the outdoor heat exchanger 130 during operation of the first heating mode of FIG. 3, the refrigerant is worked in the air-conditioning mode of FIG. 2, so that refrigerant of high temperature is supplied to the outdoor heat exchanger 130 to thereby remove frost of the outdoor heat exchanger 130.

Furthermore, in the defrost mode, a circulation direction of the cooling water to collect the waste heat of the vehicle electric devices 200 is the same as FIG. 3, and only the refrigerant is worked in the air-conditioning mode of FIG. 2, and the branch line R4 is additionally opened by the flow control valve 195.

In addition, in the dehumidification mode, when the temperature control door 151 inside the air-conditioning case 150 closes the passage bypassing the first indoor heat exchanger 110 (condenser), the air blown into the air-conditioning case 150 by the blower is cooled while passing the second indoor heat exchanger (evaporator), and then, is changed into warm air while passing the first indoor heat exchanger 110. The warm air is supplied to the inside of the vehicle to heat the inside of the vehicle.

In this instance, because the amount of the refrigerant supplied to the second indoor heat exchanger 160 is small, the air cooling efficiency becomes low, and hence, the heat pump system according to the present invention can minimize the change in the indoor temperature.

Continuously, the refrigerant circulation process will be described.

The gas phase refrigerant of high temperature and high pressure that is compressed in the compressor 100 and is discharged from the compressor 100 is introduced into the first indoor heat exchanger 110 (condenser) mounted inside the air-conditioning case 150.

The gas phase refrigerant of high temperature and high pressure introduced into the first indoor heat exchanger 110 is condensed while exchanging heat with the air blown into the air-conditioning case 150 by the blower, and in this instance, the air passing the first indoor heat exchanger 110 is changed into warm air, and then, the warm air is supplied to the inside of the vehicle to heat the inside of the vehicle.

Continuously, the refrigerant of high temperature discharged from the first indoor heat exchanger 110 flows to the outdoor heat exchanger 130 (condenser) to remove frost of the outdoor heat exchanger 130.

Continuously, the refrigerant passing the outdoor heat exchanger 130 is expanded by decompression while passing the first expansion means 140 to thereby become a liquid phase refrigerant of low temperature and low pressure, and then, the liquid phase refrigerant is supplied toward the second indoor heat exchanger 160 (evaporator). In this instance, some of the refrigerant supplied to the second indoor heat exchanger 160 flows toward the first bypass line R1 through the branch line R4.

The refrigerant supplied to the second indoor heat exchanger 160 is evaporated through heat-exchange with the air blown into the air-conditioning case 150 by the blower, and the refrigerant supplied toward the first bypass line R1 exchanges heat with the cooling water, which passes the cooling water heat exchanging part 181b, while passing the refrigerant heat exchanging part 181a of the water-cooled type heat exchanger 181 to thereby be evaporated by collecting the waste heat of the vehicle electric devices 200.

After that the refrigerants respectively passing the water-cooled type heat exchanger 181 and the second indoor heat exchanger 160 are joined together and introduced into the compressor 100, and then, recirculate in the above-mentioned cycle.

What is claimed is:

1. A heat pump system for a vehicle comprising:
   a compressor mounted on a refrigerant circulation line for compressing and discharging refrigerant;
   a first indoor heat exchanger mounted inside an air-conditioning case and connected with the refrigerant circulation line of an outlet side of the compressor to thereby exchange heat between air flowing inside the air-conditioning case and refrigerant discharged from the compressor;
   a second indoor heat exchanger mounted inside the air-conditioning case and connected with the refrigerant circulation line of an inlet side of the compressor to thereby exchange heat between the air flowing inside the air-conditioning case and the refrigerant supplied to the compressor;
   an outdoor heat exchanger mounted on the outside of the air-conditioning case for exchanging heat between the refrigerant circulating the refrigerant circulation line and the outdoor air;
   a first expansion means mounted on the refrigerant circulation line of an inlet side of the second indoor heat exchanger to expand the refrigerant supplied to the second indoor heat exchanger;
   a first bypass line mounted to connect the refrigerant circulation line of an inlet side of the first expansion means with the refrigerant circulation line of an outlet side of the second indoor heat exchanger, so that the refrigerant bypasses the first expansion means and the second indoor heat exchanger;
   a first direction-switching valve mounted at a branch point between the first bypass line and the refrigerant circulation line to thereby convert a flow direction of the refrigerant so that the refrigerant passing through the outdoor heat exchanger flows toward the first bypass line and the first expansion means;
   a heat supply means mounted on the first bypass line for supplying heat to the refrigerant flowing along the first bypass line;
   a second expansion means mounted on the refrigerant circulation line of the inlet side of the outdoor heat exchanger to selectively expand the refrigerant supplied to the outdoor heat exchanger according to the air-conditioning mode or the heat pump mode;
   a branch line adapted for connecting the refrigerant circulation with the first bypass line of the inlet side of the heat supply means so that some of the refrigerant supplied to the heat supply means of the first bypass line flows toward the second indoor heat exchanger or some of the refrigerant supplied to the second indoor heat exchanger flows toward the heat supply means of the first bypass line;
   a flow control valve mounted on the branch line to control an amount of refrigerant;
   wherein the branch line extends between a first branch point and a second branch point, thereby the branch line fluidly connects the first branch point with the second branch point, wherein the first branch point is located between the outlet of the first switching valve and the inlet of the heat supply means, and wherein the second branch point is located between the outlet of the first expansion means and the inlet of the second indoor heat exchanger.

2. The heat pump system according to claim 1, wherein the heat supply means comprises a water-cooled type heat exchanger comprising: a refrigerant heat exchanging part allowing the refrigerant flowing along the first bypass line to flow therein in order to supply the waste heat of vehicle electric devices to the refrigerant flowing along the first bypass line; and a cooling water heat exchanging part disposed on one side of the refrigerant heat exchanging part in a heat-exchangeable manner and allowing the cooling water circulating the vehicle electric devices to flow therein.

3. The heat pump system according to claim 2, wherein the heat supply means further comprises:
 a cooling water circulation line having a water pump to circulate cooling water to the vehicle electric devices;
 a water-cooled type radiator mounted on the cooling water circulation line to exchange heat between the outdoor air and the cooling water circulating the cooling water circulation line;
 a cooling water bypass line adapted to connect the cooling water circulation line and the cooling water heat exchanging part of the water-cooled type heat exchanger with each other in parallel, so that the cooling water passing the electric devices through the water pump bypasses the water-cooled type radiator and flows to the cooling water heat exchanging part; and
 a cooling water direction-switching valve mounted at a branch point between the cooling water bypass line and the cooling water circulation line to convert a flow direction of the cooling water according to the air-conditioning mode or the heat pump mode.

4. The heat pump system according to claim 1, wherein the heat supply means is mounted lower than the branch line in the refrigerant flow direction of the first bypass line.

5. The heat pump system according to claim 1, wherein a second bypass line is mounted on the refrigerant circulation line in parallel so that the refrigerant passing the second expansion means bypasses the outdoor heat exchanger, and a second direction-switching valve is mounted at a branch point between the second bypass line and the refrigerant circulation line to convert the flow direction of the refrigerant so that the refrigerant passing the second expansion valve flows to the outdoor heat exchanger or the second bypass line according to the outdoor temperature.

6. The heat pump system according to claim 5, further comprising:
 a control part that carries out a first heating mode, a dehumidification mode or a defrost mode during operation in the heat pump mode when the outdoor temperature is more than a reference temperature but carries out a second heating mode during operation in the heat pump mode when the outdoor temperature is less than the reference temperature.

7. The heat pump system according to claim 6, wherein the first heating mode has a circulation cycle that the refrigerant discharged from the compressor passes the first indoor heat exchanger, the second expansion means and the outdoor heat exchanger and flows into the first bypass line, and the refrigerant introduced into the first bypass line is returned to the compressor after passing through the heat supply means.

8. The heat pump system according to claim 6, wherein the dehumidification mode has a circulation cycle that the refrigerant discharged from the compressor passes the first indoor heat exchanger, the second expansion means and the outdoor heat exchanger and flows into the first bypass line, and some of the refrigerant introduced into the first bypass line is returned to the compressor after passing the heat supply means and the remainder of the refrigerant bypasses the first expansion means through the branch line and is returned to the compressor after passing the second indoor heat exchanger.

9. The heat pump system according to claim 6, wherein the defrost mode has a circulation cycle that the refrigerant discharged from the compressor passes the first indoor heat exchanger and the outdoor heat exchanger and flows into the first expansion means and is expanded in the first expansion means, and some of the refrigerant expanded in the first expansion manes is returned to the compressor after passing the second indoor heat exchanger and the remainder of the refrigerant is returned to the compressor after passing the heat supply means through the branch line.

10. The heat pump system according to claim 6, wherein the second heating mode has a circulation cycle that the refrigerant discharged from the compressor passes the first indoor heat exchanger and the second expansion means and bypasses the outdoor heat exchanger after flowing into the second bypass line, and some of the refrigerant passing the second bypass line flows into the first bypass line and is returned to the compressor after passing the heat supply means and the remainder of the refrigerant bypasses the first expansion means through the branch line and is returned to the compressor after passing the second indoor heat exchanger.

11. The heat pump system according to claim 10, wherein the control part controls an air flow mode into an indoor air inflow mode in such a way that the indoor air can be introduced into the air-conditioning case when the outdoor temperature is less than the reference temperature and the indoor temperature is above the reference temperature.

12. The heat pump system according to claim 1, wherein the second expansion means comprises:
 an expansion line connected on the refrigerant circulation line of the inlet side of the outdoor heat exchanger in parallel;
 an orifice mounted on the expansion line for expanding the refrigerant; and
 a third direction-switching valve mounted at a branch point between the expansion line and the refrigerant circulation line to convert the flow direction of the refrigerant so that the refrigerant passing through the first indoor heat exchanger passes through the orifice or bypasses the orifice according to the air-conditioning mode or the heat pump mode.

13. The heat pump system according to claim 1, wherein the first indoor heat exchanger and the second indoor heat exchanger are spaced apart from each other at a predetermined interval inside the air-conditioning case, the second indoor heat exchanger and the first indoor heat exchanger being mounted from the upstream side of an air flow direction inside the air-conditioning case in order.

14. The heat pump system according to claim 1, wherein the first expansion means comprises: a main body including a first flow channel having an orifice portion to expand the refrigerant supplied to the second indoor heat exchanger and a second flow channel in which the refrigerant discharged from the second indoor heat exchanger flows; a valve body seated on one side of the orifice portion to control the degree of opening of the orifice portion; and a refrigerant flowing portion formed on the seat face of the orifice portion to flow a predetermined amount of the refrigerant even in a state where the valve body is seated on the seat face of the orifice portion.

* * * * *